Aug. 25, 1953  V. SHARP  2,649,883
NUT AND DEFORMABLE HOLDER
Filed April 15, 1950  2 Sheets-Sheet 1
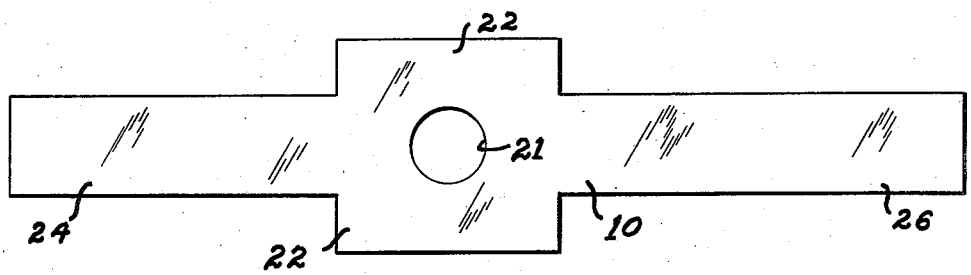
Fig. 1
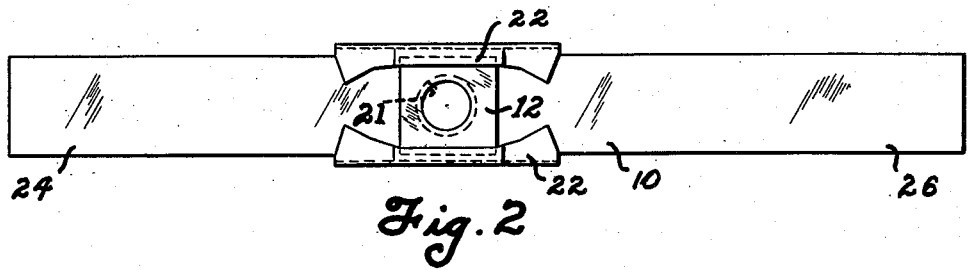
Fig. 2
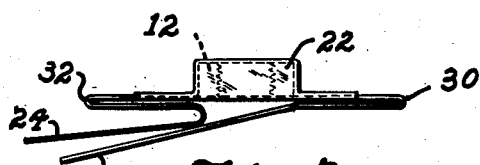
Fig. 3
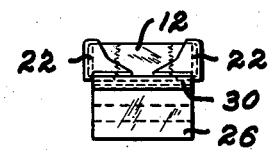
Fig. 4
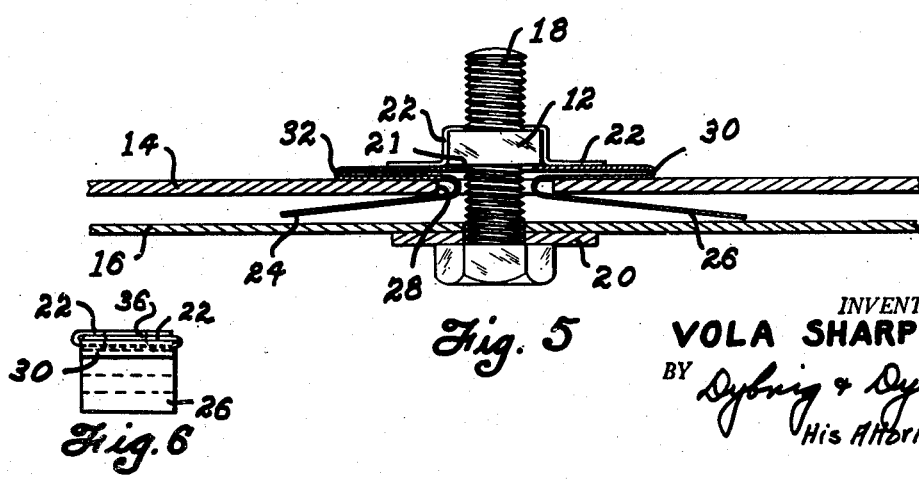
Fig. 5
Fig. 6
INVENTOR.
VOLA SHARP.
BY Dybvig & Dybvig.
His Attorneys Aug. 25, 1953     V. SHARP     2,649,883

NUT AND DEFORMABLE HOLDER

Filed April 15, 1950     2 Sheets—Sheet 2

INVENTOR.
VOLA SHARP.
BY *Dybvig & Dybvig.*
His Attorneys.

Patented Aug. 25, 1953

2,649,883

UNITED STATES PATENT OFFICE 2,649,883

NUT AND DEFORMABLE HOLDER

Vola Sharp, Dayton, Ohio, assignor to George Leonard Steck, Dayton, Ohio

Application April 15, 1950, Serial No. 156,181

3 Claims. (Cl. 151—41.74)

1

This invention relates to fasteners and more particularly to fasteners especially suitable for use in inaccessible places such as on the blind side of panels.

This application is a continuation in part of my application Serial No. 98,602, filed June 11, 1949, now abandoned.

A large number of fasteners of various types have been devised from time to time which utilize conventional cap screws and nuts which are held in place adjacent a panel opening by means of metal clips of various types. While some of the metal clips heretofore used have proven fairly satisfactory for certain types of installations where both sides of the panel adjacent the bolt opening are readily accessible, they haven't been satisfactory for use in confined or inaccessible locations. In fastening fenders to a car body, for example, the rear side of the car body panel is relatively inaccessible and therefore any fasteners, to be practical, must be insertable through the openings in the panel through which the fastening screws pass.

Toggle bolts are commonly used for some installations where the nut must be inserted through the bolt opening and wherein the one side of the panel is inaccessible, but toggle bolts are of limited application since they are inherently long and are not suitable for use in dog legs, et cetera, where space is at a premium.

It is an object of this invention to provide a fastener in which an improved type of metal clip is used for supporting a conventional nut on the rear side of an aperture in a panel and in which the fastener and nut may be mounted in place by insertion through the aperture.

More particularly, it is an object of this invention to provide a simple and practical fastener which is especially suitable for use in fastening fenders onto the body panel of a car.

Another object of this invention is to so design the metal clip as to facilitate the mounting of the nut on the clip and so as to facilitate mounting of the clip on the rear side of an aperture in a panel.

Another object of this invention is to provide a metal clip for supporting a nut in such a manner that the clip itself helps to prevent rotation of the nut when the bolt or cap screw is being tightened by a wrench.

Another object of this invention is to provide a fastener for use in securing car fenders in place wherein the nut and main threaded portion of the fastening screw are not exposed to dirt, rust and corrosion but are protected by virtue of being located inside the car body.

2

Another object of this invention is to provide a fastener for a nut for a standard ¼" cap screw which may be used for both ½ and ¾ inch holes.

Another object of this invention is to provide a fastener for use with standard ¾" x ¼" cap screws which may be installed and removed with a standard 7/16" hex socket and ratchet.

Another object of this invention is to provide a fastener which will not be loosened by vibration.

Still another object of this invention is to provide a fastener which remains in place in the body after once being installed and which permits subsequent removal of the fastening bolt or screw without losing the fastener.

Other objects and advantages reside in the construction of parts, the combination thereof and the mode of operation, as will become more apparent from the following description.

In the drawings:

Figure 1 is a plan view of the sheet metal stamping used in making the fasteners;

Figure 2 is a plan view of the stamping showing the side flanges bent over so as to hold a nut in place on the stamping;

Figure 3 is a side elevational view showing the stamping bent into shape for insertion into a hole;

Figure 4 is an end elevational view showing the device ready for insertion into a hole;

Figure 5 is a side elevational view showing the fastener partially installed;

Figure 6 is an end elevational view similar to Figure 4 but showing a slightly modified fastener;

Figure 7:
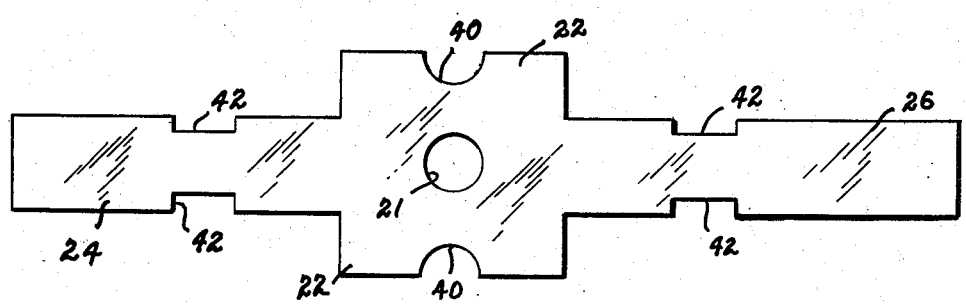
Figure 7 is a plan view of a modified sheet metal stamping used in making an improved type of fastener.

For purposes of illustration, my invention will be described as applied to an automobile for securing a fender to the car body panel, whereas it is obvious that my invention is equally applicable to other uses.

Referring now to the drawings wherein I have shown a preferred form of my invention, reference numeral 10 designates generally a stamped sheet metal member which is adapted to retain a standard nut 12 in place adjacent the rear face of a panel 14, such as the car body panel of an automobile. Reference numeral 16 designates a second panel, such as a car fender, which is adapted to be bolted to the panel 14 by means of a conventional cap screw 18. A washer element 20 has been provided, as shown, which serves its usual purpose. The washer 20 may be either a plain washer or a lock washer.

The sheet metal member 10, which is used for supporting the nut 12 in place, is made from a relatively long narrow sheet metal stamping having side flanges 22, as best shown in Figure 1. The side flanges 22 are first bent up and over onto the nut, as best shown in Figure 2. The end pieces 24 and 26 are then bent into the shape illustrated in Figure 3 of the drawings and serve as tabs for use in holding the fastener while inserting it through the hole in the panel.

It will be noted that Figure 3 shows both of the end pieces or tabs 24 and 26 projecting in the same general direction. By virtue of this arrangement, the member 10 and the nut 12 supported thereby may be inserted down through a hole 28 in the panel 14 from the front or exposed side of the panel by first inserting the one end 30 down through the hole while holding onto the tabs 24 and 26. The retainer is inserted far enough into the hole so that the other end 32 clears the edge of the hole 28 and then by pulling on the tabs 24 and 26, the projecting end portions 30 and 32 will overlie the rear side of the panel 14. The tab portion 26 is then bent into the position in which it is shown in Figure 5. By virtue of the above construction, it is possible to insert a standard size nut for a ¼" cap screw down through a ½" hole in the panel 14. Figure 5 shows the relationship of the parts before the cap screw is fully tightened. Upon tightening the cap screw, the tabs 24 and 26 will be securely clamped between the fender 16 and the panel 14.

It will be observed that the bent over flange portions 22 extend an appreciable distance beyond the opposite sides of the nut so as to reinforce the main body of the sheet metal fastener on both sides of the nut, with the result that the fastener can be used for supporting a nut for a ¼" cap screw opposite a ¾" hole. In other words, the sheet metal member 10 serves the purpose of a washer as well as a nut positioning element. Thus, unlike many of the prior types of nut supporting elements, this device may be used for supporting a nut at the rear of various size holes.

Once the nut retaining member has been installed, it is possible to remove the cap screw without removing or replacing the nut 12. Since the nut 12 is held in place on the inside of the car body 14, it is protected against slush and dirt, with the result that it is less subject to rusting and corroding.

Due to the inherent resiliency of the nut supporting member, the cap screw will not vibrate loose once the cap screw 18 is properly tightened. This is an important feature of any fastener used in automobiles and the like where there is excessive vibration.

For purposes of illustration, I have shown a preferred embodiment in which a standard nut is held in place on the sheet metal fastener, whereas certain features of my invention are applicable to fasteners in which the nut 12 would be omitted and the flanges 22 would be bent so as to directly engage the threads of the screw 18.

In Figure 6 of the drawings there is shown still another modification which is similar in every respect to the fastener shown in Figures 1 through 5, except that the nut 12 has been dispensed with and the flanges 22 have been made slightly wider and have been folded over as illustrated and then drilled and tapped so as to form the threaded aperture 36 for engaging the threaded shank of a cap screw.

For those installations in which it is important to provide a long or threaded surface for engaging the threads on the cap screw, the central aperture could be formed by extruding and then tapping so as to increase the threaded surface in accordance with well-known practice.

Figure 8:
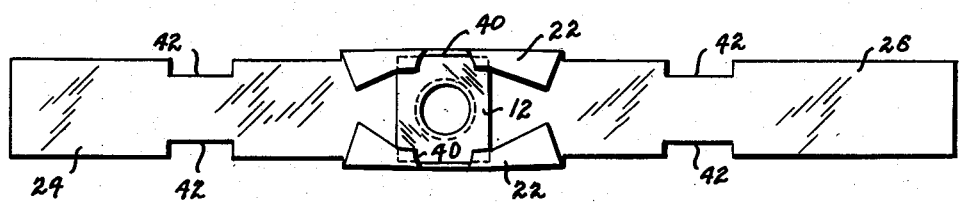
Figure 8 is a plan view of the stamping of Figure 7 showing the side flanges bent over so as to hold a nut in place.
Figure 9:
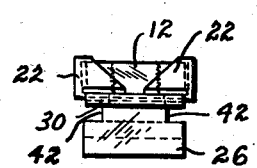
Figure 9 is an end elevational view showing the device of Figures 7 and 8 ready for insertion into a hole.

In Figures 7, 8 and 9 of the drawings I have shown an alternative clip arrangement which has a number of important advantages over the clip arrangements shown in Figures 1 through 6. Referring now to Figure 7 of the drawings, the side flanges 22 of the blank have been provided with cutouts 40 which make it much easier to wrap the nut during the clip forming operation. The cutouts eliminate distortion of the metal at this point when the nut is wrapped but do not weaken the clip in any material respect. Figure 8 shows the side flanges after they have been over onto the nut.

Unless close manufacturing tolerances are followed, some difficulty is at times experienced in properly locating the nut over the smaller holes when the clips are constructed as shown in Figures 1 through 4. In order to eliminate this difficulty, the cutout portions 42 have been provided in the main blank as shown in Figure 7. The cutout portions 42 serve a multiple purpose, as explained hereinafter. These fasteners are usually used in cramped quarters where it is difficult to firmly hold the fastener when bending over the end portion 26. Once the nut portion has been inserted through the hole, only the end portions 24 and 26 are accessible. The cutout portions effect a reduction in the width and consequently a weakening of the main blank at the exact point where the blank is to be bent. This facilitates bending the strip at the correct point. If the bend comes too close to the hole in the nut, the hole may be partially blocked thereby. Furthermore, if the strips are of full width at the points where they pass through the holes in the panel, one cannot do much shifting of the fastener relative to the hole for aligning purposes, as there is not very much clearance between the edges of the strip and the edges of the hole. By cutting away the strips at points 42, the amount of this clearance is increased considerably. When the blank is bent into shape for insertion through a hole, these cutout portions come at the point where the clip passes through the holes, whereby it is possible to center the nut over the hole even though the particular clip may deviate considerably from the intended dimensions. As clearly seen by referring to Figures 7 and 8, the notches 42 are located a distance from the ends of the flanges 22 slightly less than the distance from the ends of the flanges to the aperture in the nut. The extension of the projections or tabs 24 and 26 beyond the notches 42 is longer than the distance from the notches 42 to the ends of the flanges. The tab 26 is somewhat longer than the tab 24. It will be noted that a reduction in the width of the strip at the point where it passes through the holes does not weaken the main clip, since the main strength is needed at the point where the clip overlies the back side of the hole. By virtue of the use of the cutout portions 42, it is possible to increase the manufacturing tolerances from $\frac{1}{16}$ of an inch to $\frac{3}{16}$ of an inch on a clip for use over a ½ inch hole.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In a fastening means of the type for insertion through a hole in a blind panel for use in securing a cap screw in said hole, comprising in combination, a nut having a threaded aperture and a stamping consisting of a relatively long narrow strip of sheet metal having an aperture therein, said aperture being aligned with the aperture of the nut, flange means on said stamping, said flange means having notches formed intermediate the ends thereof, each said flange means being bent over upon the nut side, top and ends to hold the same in assembled relationship relative to the main body of the stamping and extending beyond each side of the nut so as to reinforce a portion of the stamping adapted to extend across the hole, said strip of sheet metal having comparatively long narrow extensions projecting in opposite directions from the ends of the flange means, each of said extensions having a pair of laterally and oppositely disposed notches, said notches being located a distance from the ends of the flange means slightly less than the distance from the ends of the flange means to the aperture in the nut, each of the extensions having a portion projecting beyond the notches a distance greater than the distance from the notches to the ends of the flange means.

2. In a fastening means of the type for insertion through a hole in a blind panel for use in securing a cap screw in said hole, comprising in combination, a nut having a threaded aperture and strip of sheet metal having a main body portion provided with an aperture registering with the aperture in the nut, flange means on opposite sides of said main body portion, each said flange means being bent over upon the nut side, top and ends to hold the same fixedly in position upon the main body portion, both ends of each of the flange means extending beyond the nut so as to reinforce said main body portion adapted to span the hole in the blind panel, a comparatively long and narrow U-shaped strip having one leg integral with one end of the main body portion, one leg of said strip being folded on the underside of the main body portion and extending towards the aperture in the main body portion, said strip being provided with lateral notches at the bight of the U so as to reduce the width of the strip where it has been formed into U-shape, and a second comparatively long and narrow strip integral with the other end of said main body portion, said second strip underlying the main body portion and overlapping at least a portion of said U-shaped strip, said second strip having laterally and inwardly disposed notches on both sides thereof, said notches being located in said second strip a distance from the adjacent end of the main body portion, which distance is slightly less than the distance from the end of the main body portion to the aperture therein, said second strip being weaker across the notched portion than elsewhere to facilitate bending thereof when the fastening means is put to use in the hole in the blind panel.

3. In a fastening means according to claim 2, wherein the end of the second strip extending beyond the notches therein is greater than the length of either leg of the U-shaped strip.

VOLA SHARP.

References Cited in the file of this patent

UNITED STATES PATENTS

| Number | Name | Date |
| --- | --- | --- |
| 991,447 | Kennedy | May 2, 1911 |
| 1,581,416 | Alpaugh | Apr. 20, 1926 |
| 1,931,011 | Richardson et al. | Oct. 17, 1933 |
| 2,080,545 | Ross | May 18, 1937 |
| 2,307,405 | Hower | Jan. 5, 1943 |

FOREIGN PATENTS

| Number | Country | Date |
| --- | --- | --- |
| 551,214 | Great Britain | Feb. 12, 1943 |